April 10, 1934.                L. WYGODSKY                1,953,982
                                FOOD APPLIANCE
                              Filed May 11, 1928
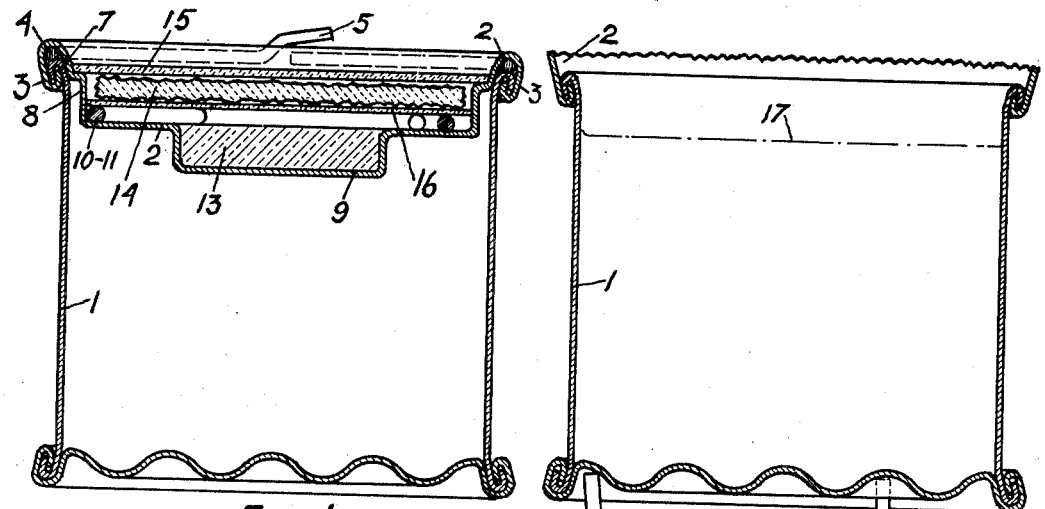
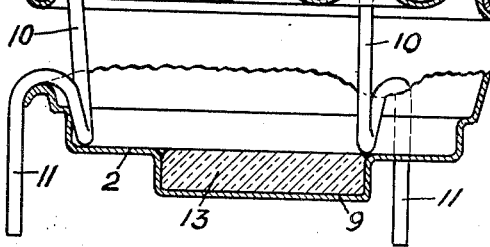
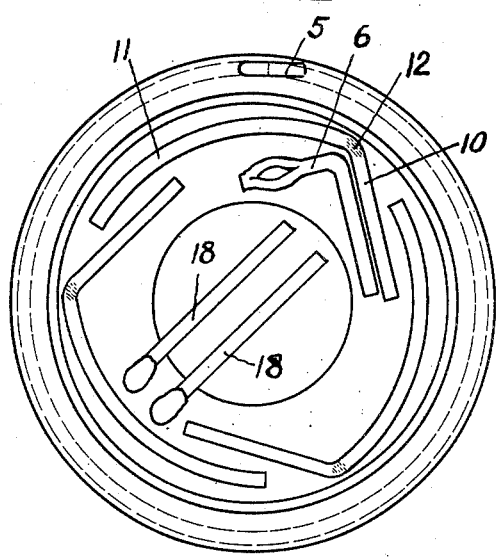
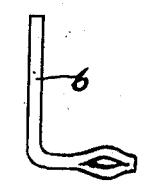
INVENTOR
Leon Wygodsky

UNITED STATES PATENT OFFICE

1,953,982

FOOD APPLIANCE

Leon Wygodsky, Baltimore, Md.

Application May 11, 1928, Serial No. 277,004

4 Claims. (Cl. 126—262)

The object of my invention is the providing of an appliance for containing and heating food.

A further object of my invention is the providing an improved container for food, which container is provided with means for heating the food contained therein.

A further object of my invention is an improved means in a food container for separating parts thereof.

A further object of my invention is an improved heating device provided with a heating element forming a part of a food container.

A further object of my invention is a food heating device consisting of the container of the same provided with heating means and improved means for adjustments thereof.

A further object of my invention is an improved food container heating device.

With the foregoing and other objects in view, my invention consists of the novel construction, combination and arrangement of parts as hereinafter specifically described and illustrated in the accompanying drawing, wherein is shown the preferred embodiment of my invention, but it is understood that changes, variations and modifications may be resorted to which come within the scope of the claims as hereunto appended.

In the drawing of the herein described embodiment of my invention, Figure 1 represents a food container in elevation in section; Fig. 2 is a plan view of the container shown in Fig. 1, with certain parts removed; Fig. 3 is a sectional view of the container shown in Fig. 1 after having been opened and the part forming the cover thereof placed beneath and positioned for heating purposes, mostly shown in section; Fig. 4 is a detail view of the key for opening the container, which is also shown in Fig. 2.

Similar numerals refer to similar parts throughout the several views.

1 is the body of the container, such, as a tin can, or the like, in which food products, such as soups, etc., may be contained and are hermetically sealed. 2 is the cover which is secured to body 1 by its edge 3. 4 is the opening or cutting wire located within a crease in the cover 2 near its edge and protruding at 5 for engagement by opening key 6.

As shown in the drawing, the cover is made deep so as to provide space on the top of the food products within the can after opening to permit of expansion, and thus prevent the contents from overflowing on heating. The cover is attached to body 1 by means of the usual solderless double seam, as shown in the drawing. This, however, is not necessary, as any convenient method of attaching may be used. The top of the body has an expanded portion, as shown at 7, in which the cover fits, this expansion permitting an easy removal of the cover after the same has been torn loose from its fastenings, the cover below this point being contracted, as shown at 8.

In cover 2 (see Fig. 1) is a recess portion 9 provided to hold heating the element 13, such as, solidified alcohol, or any other suitable heat producing material. Within cover 2, referring particularly to Figure 2, are supporting elements 10 and legs 11; these I have formed as the two ends of a wire secured at 12 to the top 2 by any suitable means, such as, spot welding or soldering. 14 is a cracker, or any desirable solid food; I have shown only one cracker, but ordinarily two, or more, would be placed in the cover and secured there by element 15, which may be a label, if desired. I might state here that the label is preferably on top, as suggested above, and removed from the can before heating; otherwise, disagreeable odors would be caused by the burning of the same. The key 6 is laid loose within the cover, as shown in Fig. 2. In packing the device, as shown in Fig. 1, a sheet of impervious material 16, such as wax paper, is laid within the cover on top of the key, legs and supporting elements, and upon this the crackers are placed. There may be also placed within the space with the key one or more matches 18, to be used for lighting. The bottom of the container is preferably made corrugated to afford a considerable area for heating purposes.

The operation of my invention is as follows:

The container and contents, with the cracker and other appliances, provide means for obtaining a hot meal by the following procedure: The label 15 being removed, key 6 is threaded on to end 5 of the wire and the wire is wound upon the key and in doing so it breaks away the cover near its edge, thus separating the cover from the body of the can. The cover being removed, the body forms a container for its contents in which the same may be heated, the level of the fluid being as indicated in Fig. 3 by a broken line 17. The supporting elements 10 are bent up, as shown in Fig. 3, and the legs 11 are bent downward, as shown in the same figure, thus forming a stand upon which the body 1 may rest. Separator 16 being removed, fire is applied to heating element 13 and the contents of the can is thereby heated.

In the drawing, I have shown cylindrical containers, but square, oblong, flaring, or elliptical containers, or any shape desired, may be adapted for my improved appliance.

The opening, or cutting, member 4 may consist of round wire, or may be of any cross-section shape, I do not wish to limit myself to the round shape, as shown in the drawing. It is bent at one end 5′ to form an anchorage to cover 2 in which it is enclosed so that in its winding upon key 6 it will not pull out of said cover 2.

Having thus described my invention, what I claim and desire to secure by Letters Patent is:

1. A combined heater and container for liquid food comprising a can having a removable closure upon one end thereof for hermetically sealing the same and for containing the heating means, said closure having an annularly stepped recessed portion depending within the can, the lowermost part of which forms a cup-like portion for containing solid fuel, horizontally disposed supporting members secured on the upper side of said stepped portion, which upon removal of the closure, may be bent to form vertically disposed legs projecting from both sides of said closure for supporting the same and the can in spaced relation thereabove, a partition member resting on said supporting members, and a removable cover for said recess for sealedly closing the same, said cover and partition forming therebetween a compartment for solid materials.

2. A combined container and heater for food comprising a can having a removable closure upon one end thereof for hermetically sealing the same and for containing the heating means, said closure having an annularly stepped recessed portion extending into the can, the innermost part of said recessed portion forming a cup-like portion for containing solid fuel, supporting members secured on the outer side of said stepped portion and which upon removal of the closure may be bent to form vertically disposed legs projecting from both sides of said closure for supporting the same and the can in spaced relation thereabove, a partition member disposed against said supporting members, and a removable cover for said recess for sealedly closing the same, said cover and partition forming therebetween a compartment for solid materials.

3. A combined container and heater for food comprising a can having a removable closure upon one end thereof for hermetically sealing the same and for containing heating means, said closure having an annularly stepped recessed portion extending into the can, the innermost part of said recessed portion being formed as a cup-like portion for containing solid fuel, supporting members secured on the outer side of said stepped portion and which upon removal of the closure may be moved to form substantially vertically disposed legs projecting from both sides of said closure for supporting the same and for supporting the can in spaced relation above the closure, a partition member disposed against said supporting members, and a removable cover for said recess for sealedly closing the same, said cover and partition forming therebetween a compartment for solid materials.

4. A combined container and heater for food comprising a can having a removable closure upon one end thereof for hermetically sealing the same and for containing heating means, said closure having an annularly stepped recessed portion extending into the can, the innermost part of which forms a cup-like portion for containing solid fuel, supporting members secured on and resting against the outer side of said stepped portion and which upon removal of the closure may be bent to form vertically disposed legs projecting from both sides of said closure for supporting the same and for supporting the can in spaced relation thereabove, and a removable cover for said recess for sealedly closing the same.

LEON WYGODSKY.